US012494310B2

(12) United States Patent
Bosque et al.

(10) Patent No.: US 12,494,310 B2
(45) Date of Patent: Dec. 9, 2025

(54) SYSTEM AND METHOD TO MANAGE PANCAKE DEFORMATION IN REBCO WOUND MAGNET

(71) Applicant: Florida State University Research Foundation, Inc., Tallahassee, FL (US)

(72) Inventors: Ernesto Bosque, Tallahassee, FL (US); Dylan Kolb-Bond, Tallahassee, FL (US); Adam Voran, Tallahassee, FL (US); Andrey Gavrilin, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 176 days.

(21) Appl. No.: 18/590,228

(22) Filed: Feb. 28, 2024

(65) Prior Publication Data

US 2025/0037916 A1 Jan. 30, 2025

Related U.S. Application Data

(60) Provisional application No. 63/448,920, filed on Feb. 28, 2023.

(51) Int. Cl.
*H01F 6/06* (2006.01)
*H01F 41/071* (2016.01)

(52) U.S. Cl.
CPC ............. *H01F 6/06* (2013.01); *H01F 41/071* (2016.01)

(58) Field of Classification Search
CPC ........................................................ H01F 6/06
USPC ........................................................ 335/216
See application file for complete search history.

(56) References Cited

U.S. PATENT DOCUMENTS

| | | | | |
|---|---|---|---|---|
| 3,813,764 A * | 6/1974 | Tanaka | H01F 6/06 | 428/661 |
| 3,919,677 A * | 11/1975 | Young | H01F 6/06 | 505/879 |
| 5,310,705 A * | 5/1994 | Mitlitsky | H01F 6/06 | 505/879 |

(Continued)

OTHER PUBLICATIONS

Bosque et al.:"Observations of REBCO Disk Dishing in Multi-tape Insulated Test Coils", National MagLAb, ASC 2022 Conference.

*Primary Examiner* — Alexander Talpalatski
(74) *Attorney, Agent, or Firm* — Fox Rothschild LLP

(57) ABSTRACT

A non-bonded, tape wound magnet includes a stack of disk coils, the disk coils having outer radius $r_d$ stacked on a z axis having opposing terminal ends. The disk coils include pancake-wound superconducting tape including a superconducting material and having a wound radius $r_{sc}$. At least one disk coil at each opposing terminal end of the stack has overbanding positioned radially outward from the pancake wound superconducting tape. The overbanding has an elastic modulus and ultimate tensile strength at least 50% greater than the elastic modulus and ultimate tensile strength of the superconducting tape, and an electrical resistance at least 100% greater than that of the superconducting material, the overbanding having a radial dimension $r_o$. The overbanding applies radial compression to the pancake wound superconducting tape. A method of making a magnet is also disclosed.

17 Claims, 14 Drawing Sheets

(56) References Cited

U.S. PATENT DOCUMENTS

| | | | | | |
|---|---|---|---|---|---|
| 5,604,473 | A * | 2/1997 | Rodenbush | H01F 6/06 505/879 |
| 8,354,907 | B2 * | 1/2013 | Fukaya | H01F 6/00 335/216 |
| 10,643,772 | B2 * | 5/2020 | Morita | C01G 3/006 |
| 10,748,691 | B2 * | 8/2020 | Morita | C04B 35/653 |
| 2003/0059652 | A1 * | 3/2003 | Wang | H10N 60/0801 428/472 |
| 2016/0155554 | A1 * | 6/2016 | Morita | H01F 6/00 335/216 |

* cited by examiner

SYSTEM AND METHOD TO MANAGE PANCAKE DEFORMATION IN REBCO WOUND MAGNET

CROSS-REFERENCE TO RELATED APPLICATIONS

This application claims priority to U.S. 63/448,920 filed on Feb. 28, 2023, entitled "METHOD TO MANAGE PANCAKE DEFORMATION IN REBCO WOUND MAGNET", the entire disclosure of which incorporated herein by reference.

STATEMENT REGARDING FEDERALLY SPONSORED RESEARCH AND DEVELOPMENT

This invention was made with government support under Contract Nos. DMR-2131790 and DMR-1644779 awarded by the National Science Foundation. The government has certain rights in this invention.

FIELD OF THE INVENTION

The present invention relates generally to systems and methods to prevent deformation of magnets, and more particularly of high field magnets.

BACKGROUND OF THE INVENTION

Pancake coil deformation is a problem that is particularly acute in high field magnets, for example, magnets generating fields of 30 Tesla or more, with tape windings in high radial fields. The problem has been well observed and measured as an issue at the terminal ends of a stack of disk-shaped coils making up the magnet. This deformation affects magnet performance and can result in permanent damage to the magnet.

SUMMARY OF THE INVENTION

A non-bonded, tape wound magnet, includes a stack of disk coils, the disk coils having outer radius $r_d$ stacked on a z axis having opposing terminal ends. The disk coils include pancake-wound superconducting tape. The superconducting tape includes a superconducting material and having a wound radius $r_{sc}$. At least one disk coil comprises overbanding. The overbanding is positioned radially outward from the pancake wound superconducting tape of a disk, and comprises a material that has an elastic modulus and ultimate tensile strength at least 50% greater than the elastic modulus and ultimate tensile strength of the superconducting tape. The overbanding applies radial compression to the pancake wound superconducting tape.

The radial dimension $r_o$ of the overbanding from disk coil to disk coil can be symmetrical about the z axis. The overbanding can include a material with a coefficient of linear expansion and the coefficient of linear expansion of the overbanding is selected such the overbanding will remain in contact with and apply radial compression to the superconducting tape as the temperature of the magnet is lowered. The coefficient of linear expansion of the overbanding from 293 K to 4 K can be within 125% of the coefficient of linear expansion of the superconducting tape from 293 K to 4 K.

The overbanding of a disk coil can be a pancake wound tape wound about a pancake wound superconducting tape in the disk coil so as to apply radial compression to the pancake wound superconducting tape. The overbanding can be any suitable material, and can for example include stainless steel, Hastelloy, and/or Inconel®.

The radius $r_{sc}$ of the pancake-wound superconducting tape for different disk coils can be staggered with the $r_{sc}$ of disk coils at the terminal ends being less than the $r_{sc}$ for disk coils not at the terminal ends. The radial dimension $r_o$ of the overbanding for the respective disk coils can be staggered. The overbanding can have an electrical resistance at least 100% greater than that of the superconducting material, the overbanding having a radial dimension $r_o$. A disk coil comprising overbanding can be provided at each opposing terminal end of the stack.

A method of preventing deformation in a non-bonded, tape wound magnet, includes the step of providing a stack of disk coils having outer radius $r_d$ stacked on a z axis having opposing terminal ends. The disk coils include pancake-wound superconducting tape. The superconducting tape includes a superconducting material. At least one disk coil is provided at each opposing terminal end of the stack and has overbanding. The overbanding is positioned radially outward from the pancake wound superconducting tape of a disk, and comprises a material that has an elastic modulus and ultimate tensile strength at least 50% greater than the elastic modulus and ultimate tensile strength of the superconducting tape. Radial compression is applied to the pancake wound superconducting tape with the overbanding. The magnet is operated, wherein the radial compression of the overbanding will act against deformation of the respective disk coil.

The radial dimension $r_o$ of the overbanding from disk coil to disk coil can be symmetrical about the z axis. The overbanding can include a material with a coefficient of linear expansion and the coefficient of linear expansion of the overbanding is selected such the overbanding remains in contact with and applies radial compression to the superconducting tape as the temperature of the magnet is lowered. The coefficient of linear expansion between 293 K and 4 K of the overbanding can be within 125% of the coefficient of linear expansion from 293 K and 4 K of the superconducting tape.

The overbanding of a disk coil can be a pancake wound tape that is wound about a pancake wound superconducting tape in the disk coil so as to apply radial compression to the pancake wound superconducting tape. The overbanding can include stainless steel, Hastelloy, or Inconel®.

The radius $r_{sc}$ of the pancake-wound superconducting tape for different disk coils can be staggered with the $r_{sc}$ of disk coils at the terminal ends being less than the $r_{sc}$ for disk coils not at the terminal ends. The radial dimension $r_o$ of the overbanding for the respective disk coils can be staggered. The overbanding can be selected to have an electrical resistance at least 100% greater than that of the superconducting tape.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
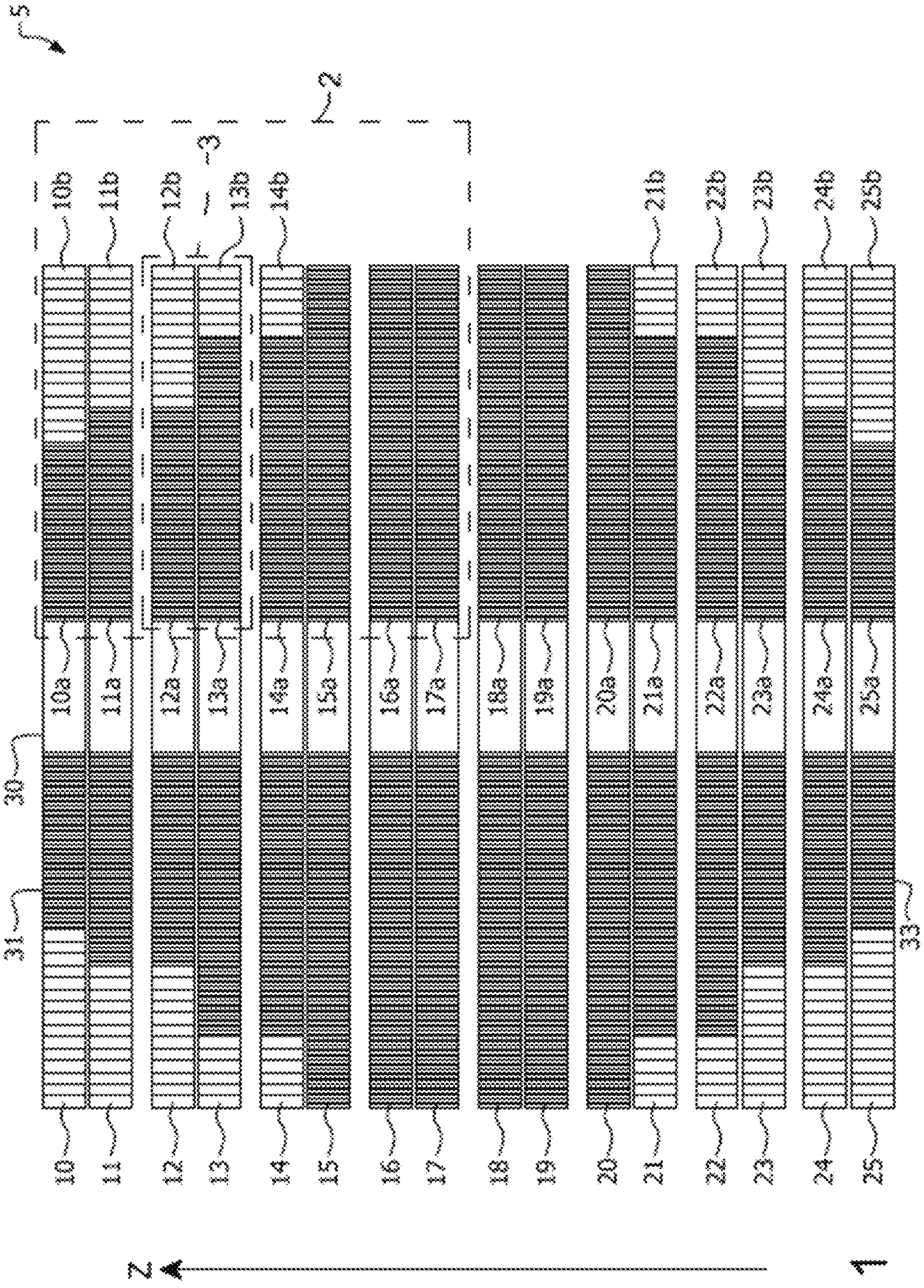
FIG. 1 is a schematic cross section of a pancake disk coil stack with overbanding according to the invention.

A non-bonded, tape-wound magnet for generating high fields can be formed from a stack of pancake or disk coils having outer radius $r_d$ and can be axially stacked on the z axis. The stack has terminal ends at opposing axial ends of the stack along this z axis. The disk coils include pancake-wound superconducting tape. The superconducting tape includes a superconducting material. The superconducting tape has a wound radius $r_{sc}$. A number x of the disk coils can according to the present invention include overbanding. Overbanding is the addition of several turns of the disk with overbanding material not energized with transport current.

At least one disk coil at or near each opposing terminal end of the stack has overbanding, wherein the overbanding is positioned radially outward from the pancake wound superconducting tape of the disk coil. The overbanding has a radial dimension $r_o$. The overbanding applies radial compression to the pancake wound superconducting tape.

The overbanding can take different forms. In one embodiment, the overbanding of a disk coil that has a pancake wound superconducting tape can be a pancake wound overbanding tape that is wound tightly about the superconducting tape so as to apply radial compression to the pancake wound superconducting tape. The overbanding can be an elongated tape having the same width and thickness as the superconductor tape, or can have differing dimensions. The overbanding can alternatively take other forms, and can comprise a single ring of material that surrounds the superconducting tape and applies radial inward compression to the superconducting tape.

The overbanding can be made from different materials. The overbanding can comprise a material that has an elastic modulus and ultimate tensile strength at least 50% greater than the elastic modulus and ultimate tensile strength of the superconducting tape. The overbanding can have an electrical resistance at least 100% greater than that of the superconducting material. Suitable materials for the overbanding include stainless steel, Hastelloy, and Inconel®. Other materials are possible.

High temperature superconductors operate at temperatures below about 90 K, so significant thermal contraction can be encountered. The overbanding can be made from materials such that the coefficient of thermal expansion will ensure that the overbanding will remain in contact with and apply radial compression to the superconducting tape as the temperature of the magnet is lowered. The overbanding material should thermally contract at least as much as the superconducting tape. Equal thermal contraction is sufficient, but it would be preferred that the overbanding material have a thermal contraction coefficient larger than the superconductor to further promote radial compression upon cooling down. The overbanding material can have a coefficient of linear expansion between 293 K and 4 K that is 0 to ~125% of the negative linear coefficient of expansion of the conductor, or within a range of any high value and low value selected from these values.

Figure 2:
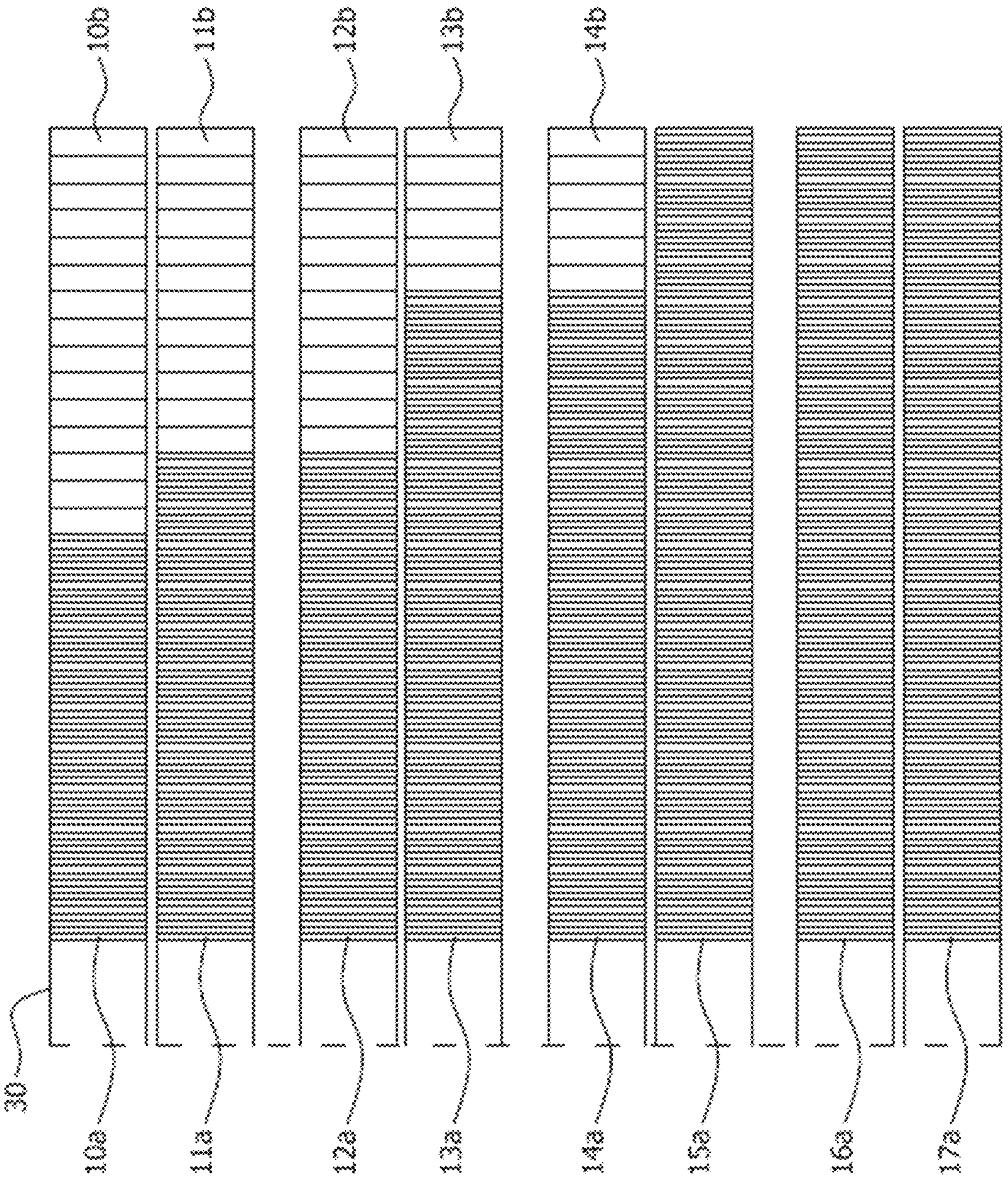
FIG. 2 is an enlarged view of area 2 in FIG. 1.
Figure 3:
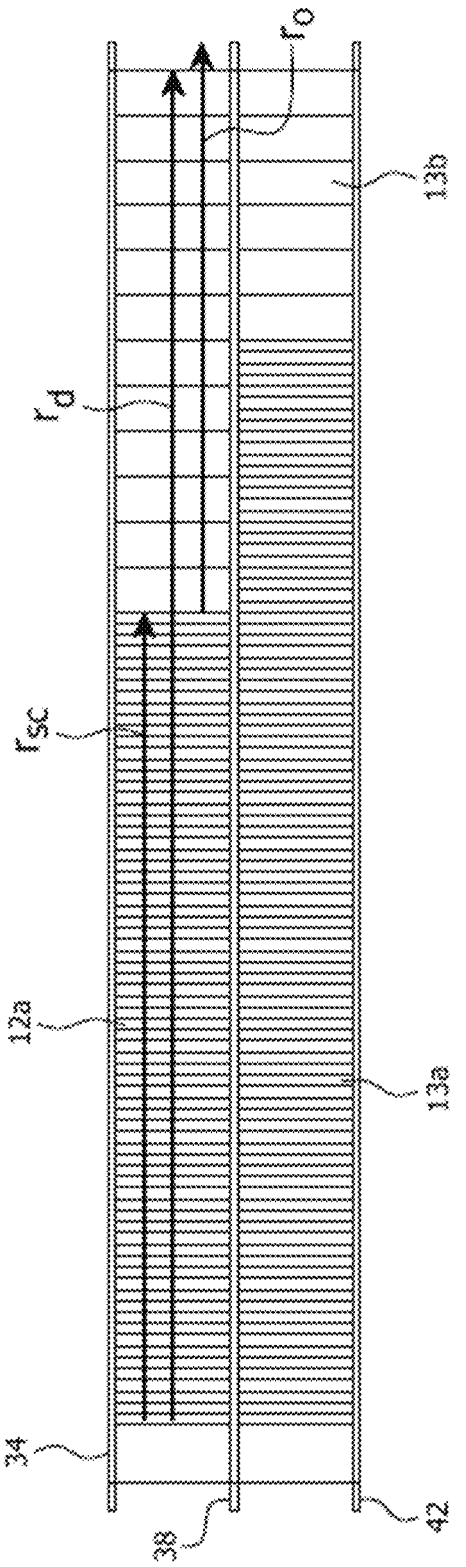
FIG. 3 is an enlarged view of area 3 in FIG. 1.

There is shown in FIGS. 1-3 a stack of disk coils 10-25 comprising pancake wound superconductor tape 10*a*-25*a*, respectively. The superconducting tape is wound about a central core 30. Some of the disk coils 10-14 and 21-25 have overbanding 10*b*-14*b* and 21*b*-25*b*. The radius of the disk coil $r_d$ excluding the central core 30 is the sum of the radial dimension of the superconducting tape $r_{sc}$ and if present the radial dimension of the overbanding $r_o$ (FIG. 3).

The overbanding can be staggered, meaning that there is more overbanding for disks nearer the terminal end of the stack. In an elongated magnet, the radial component of the magnetic field is greatest near the terminal ends of the magnet, and therefore the overbanding will usually need to be greatest at or near the terminal ends of the magnet. Also, the overbanding can be staggered symmetrically at both terminal ends of the stack of disk coils along the z axis. The radial dimension $r_o$ of the overbanding from disk coil to disk coil can be different but also symmetrical about the z axis. For example, as shown in FIG. 1, the $r_o$ of the overbanding 10*b* of disk coil 10 at the terminal end 31 of magnet 5 is the same as the $r_o$ of overbanding 25*b* of disk coil 25 at the opposing terminal end 33 of the magnet 5. Similarly, the $r_o$ of the overbanding 11*b* of next closest disk coil 11 at the terminal end 31 of magnet 5 is different from the $r_o$ of the overbanding 10*b*, but the same as the $r_o$ of overbanding 24*b* of next closest disk coil 24 at the opposing terminal end 33 of the magnet 5. The radius $r_{sc}$ of the pancake-wound superconducting tape for different disk coils is similarly staggered with the $r_{sc}$ of superconducting tape 10*a* for disk coil 10 at the terminal end 31 being less than the $r_{sc}$ for disk coils not at the terminal ends, such as the $r_{sc}$ for the superconducting tape 11*a* for the next inner disk coil 11 at the terminal end 31. The radial dimension $r_o$ of the overbanding for the respective disk coils is staggered, and $r_d=r_{sc}+r_o$ for each disk coil. The disk coil total radial dimension $r_d$ of all of the disk coils will usually be the same, but can also be different.

The number of disks with overbanding x will depend at least in part on the total number n of disks in the stack. In the example of FIG. 1, a stack of n=16 coil disks might have the top and bottom 5 disk coils, x=10 total, with overbanding and the overbanding can progressively increase toward the terminal ends along the z axis. As noted, the amount of overbanding is preferably symmetrical. The terminal end-most disks, in this example, disk coil 10 and disk coil 25, will have matching amounts of overbanding. The next end-most disks moving toward the center of the stack on the z axis (disk coil 11 and disk coil 24) will have the same or less overbanding as the end-most disks, but can also have symmetric amounts of overbanding with each other. The symmetric overbanding will continue for subsequent disk pairs (disk coil 12 and disk coil 23, disk coil 13 and disk coil 22, and disk coil 14 and disk coil 21) until there is no further reducing of overbanding in more centrally located disks in the stack, in this example disk coils 15-20.

FIG. 3 is a schematic cross-sectional diagram of area 3 in FIG. 1. It is a module, or double-pancake disk, coil stack of a high field magnet. The topmost disk 12 has overbanding 12*b* according to the invention. The bottom disk has less overbanding 13*b*, and can in some instances have no overbanding. Contact elements between each geometry are "soft," wherein within the numerical analysis some materials are allowed to overlap in the modeling-physically impossible in real life. Spacers 34, 38 and 42 are extended to prevent windings from "escaping". The overbanding material should have an elastic modulus larger than the conductor and an ultimate tensile strength larger than the conductor. As compared to the superconducting windings, the overbanding 12*b* and 13*b* can have an elastic modulus and ultimate tensile strength at least 50% greater than the elastic modulus and ultimate tensile strength of the superconducting tape 12*a* and 13*a*. The overbanding material should be a high resistance material, and can have a resistance at least 100% higher than the electrical resistance of the superconductor tape. The overbanding material can also have a linear coefficient of expansion matching to 125% the linear coefficient of expansion of the conductor.

Figure 5:
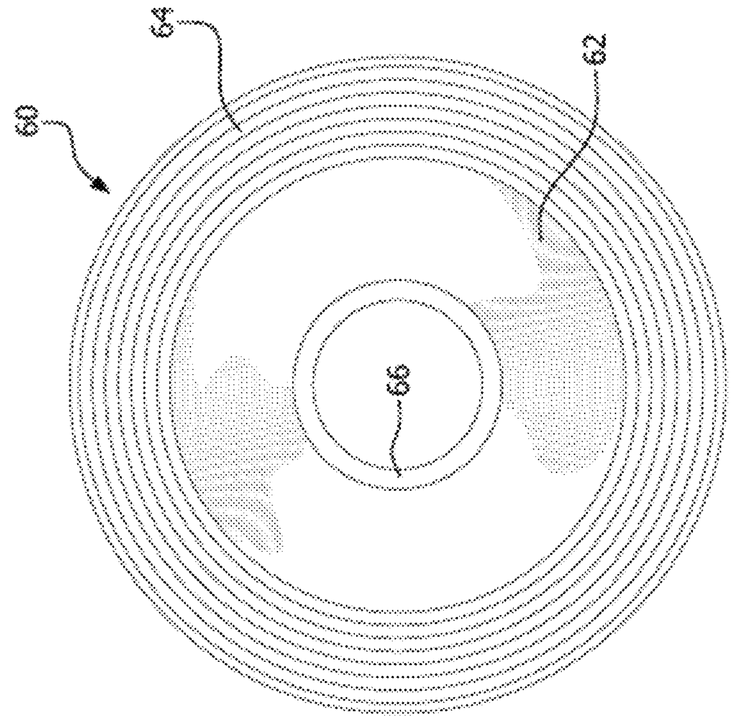
FIG. 5 is a plan view of a disk coil with overbanding.
Figure 4:
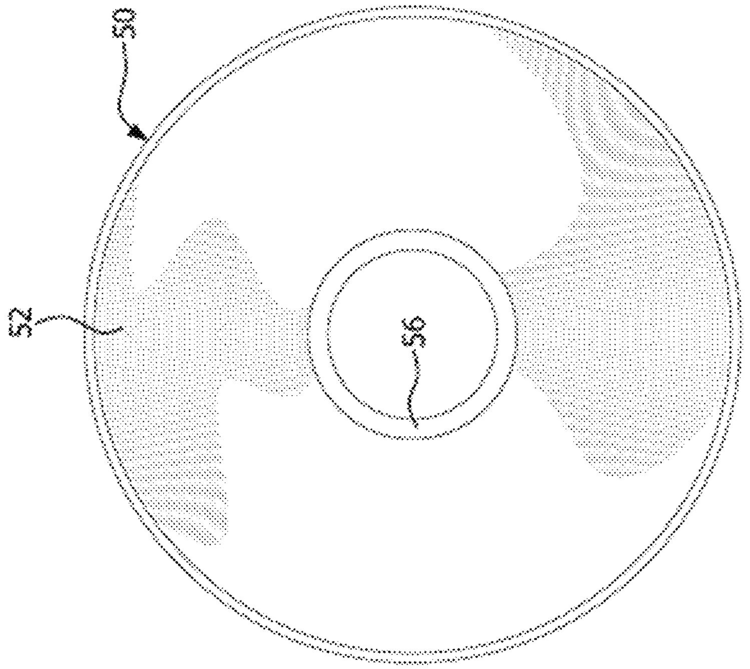
FIG. 4 is a plan view of a disk coil without overbanding.

There is shown in FIG. 4 a disk coil 50 with superconducting tape 52 wound about a core 56. There is no overbanding. The is shown in FIG. 5 a disk coil 60 with superconducting tape 62 wound about a core 66. Overbanding 64 is wound about the superconducting tape 62 so as to apply a radially compressive force to the superconducting tape 62.

The conductor can be selected from many possible materials. In high field (greater than 30 Tesla) magnets, the conductor can comprise a high temperature superconductive material such as rare-earth barium copper oxide (REBCO). Other conductor materials are possible. A REBCO superconductor has a linear coefficient of expansion of about $-8\times10^{-6}$/K, between 293 K and 4 K. In such a case, the material making up the overbanding can have a linear coefficient of expansion greater than $-10\times10^{-6}$/K, between 293 K and 4 K.

Figure 6:
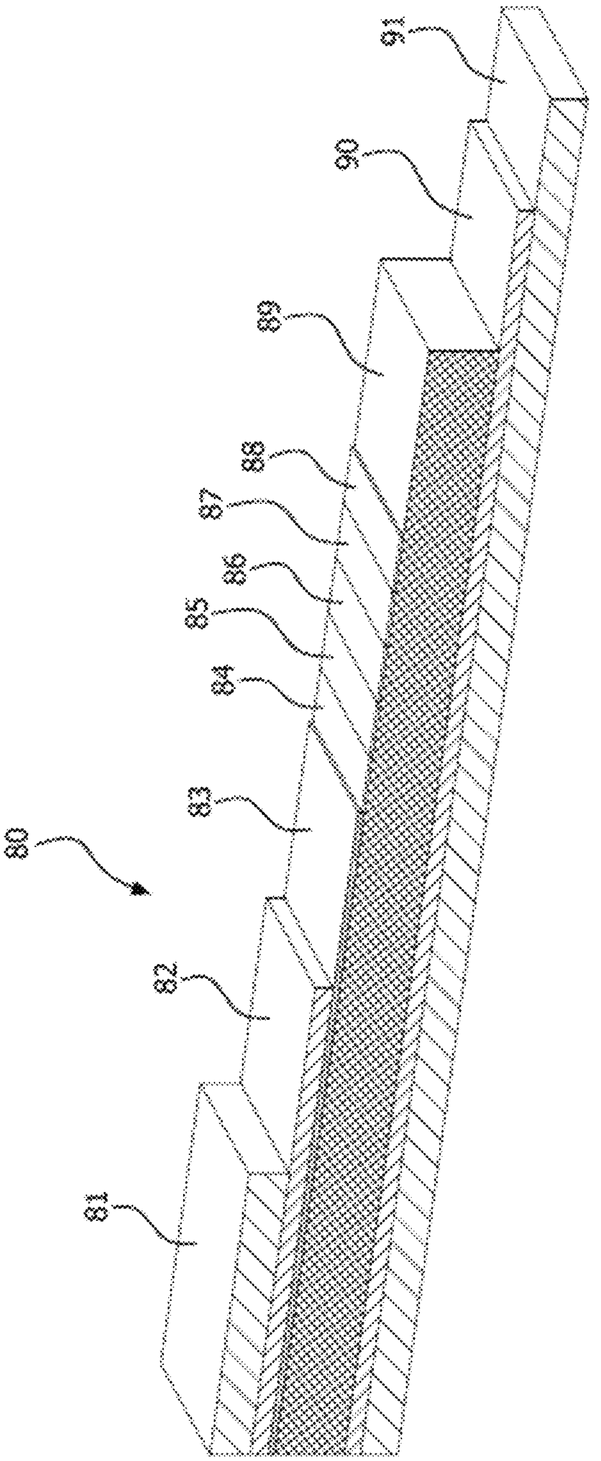
FIG. 6 is a perspective view, partially broken away, of a REBCO conductor.

One example of a suitable superconductor tape 80 is illustrated in FIG. 6. The superconductor tape 80 can include a copper stabilizer cladding layer 81, silver wrapping layer 82, REBCO high temperature superconductor (HTS) layer 83, buffer stack layers 84-88, substrate 89, another silver wrapping layer 90, and another copper stabilizer cladding layer 91. Many other different kinds of superconductor tapes can be used with the invention.

Figure 7:
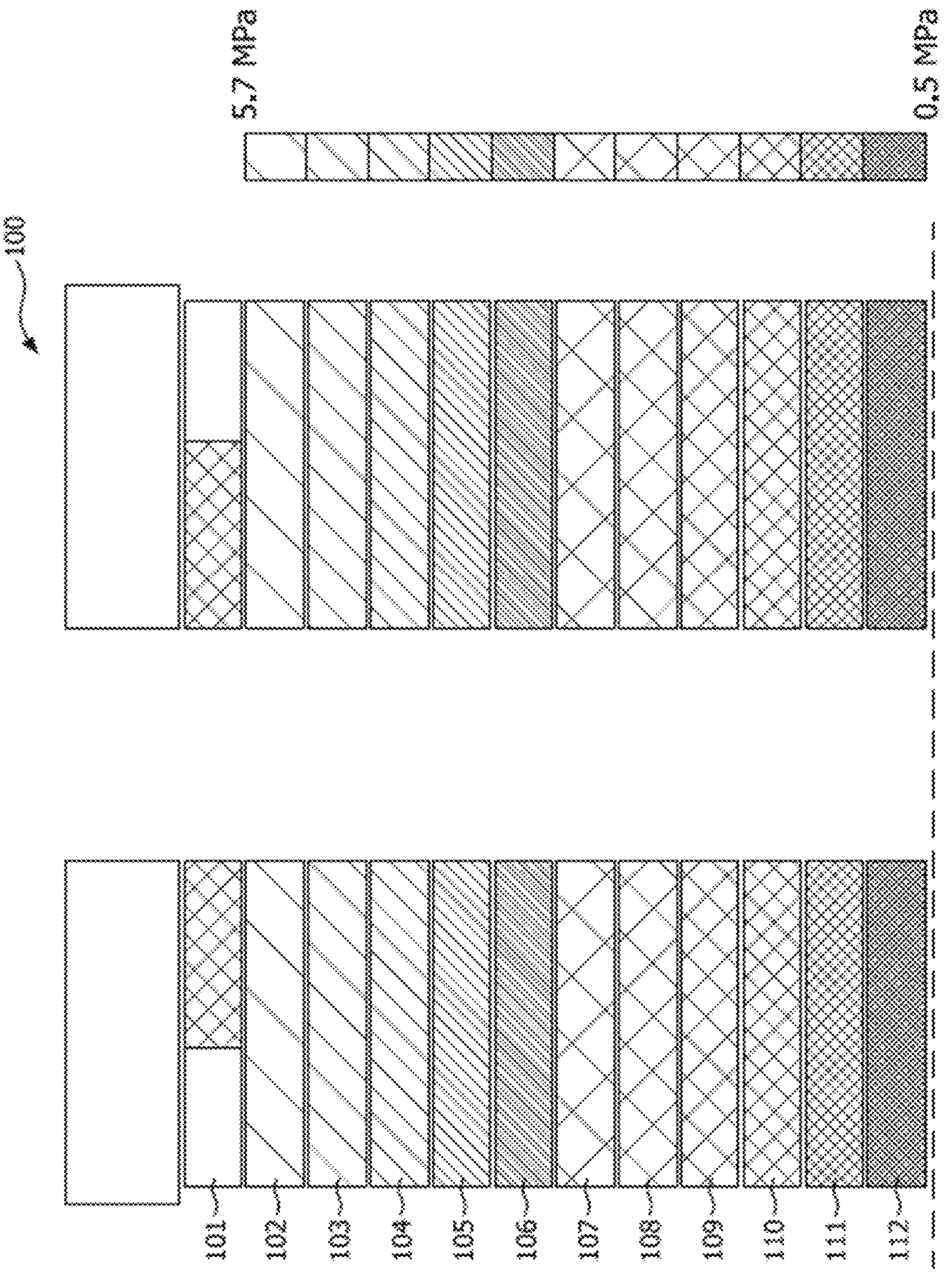
FIG. 7 is a schematic cross section of a disk coil stack illustrating the axial clamping force of each disk about the midplane of a full disk coil stack.

The amount of radial compression that is applied by the overbanding can vary. The necessary compression will depend on many factors, such as the nature and makeup of the superconductor tape, the operating field generated by the magnet, the sizer of the magnet, as well as other factors. There is shown in FIG. 7 a schematic cross-section of the top half of a pancake disk coil stack 100 that is comprised of disk coils 101-112. The dashed bottom line is the midplane of the coil stack. It can be seen in this example that the axial pressure from each disk varies from 5.7 MPa to 0.5 MPa. Calculation of net axial pressure, which is a summation of disks away from the midplane shows no concern with respect to axial electromagnetic forces. The invention acts to prevent a wide disparity of axial pressure. The disk coil is observed to maintain radial compression even with screening current induced strains, meaning that dishing for this disk is expected to be negligible, if present at all.

Staggering of the outer diameter from terminal end disks will eliminate dishing propagation through the axial (z) length. Careful control of the outer diameter of the superconductor making up each disk coil within a stack module will help to maintain crossover connections. Constraining the rotation angle will limit dishing. The essential principal of the present invention is to apply this outer diameter staggering of overbanding to disk coils near the ends of a disk coil stack in operation or when standing, in order to eliminate or reduce dishing and undesirable axial movement. Numerical modeling of the phenomenon and the expected behavior of the most recent test coil has been performed.

Figure 8:
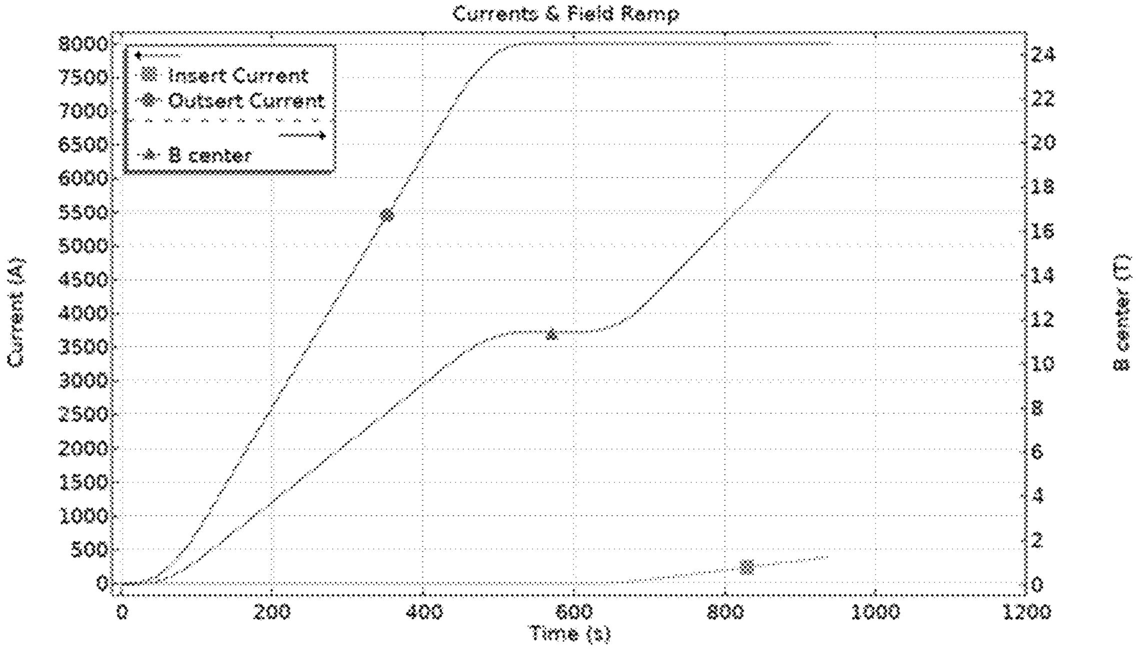
FIG. 8 is a plot of Current (A) and Field (T) vs Time(s).

FIG. 8 is a plot of Current (A) and Field center (T) versus Time(s). This shows the charging cycle for the combined system. The outsert of combined magnets is charged first, followed by the insert. The generated field is then a superposition, or cumulative sum, of both magnets being energized. There is some evidence that the order of energization (i.e. insert charged before outsert) can reduce the strains—but not eliminate the rotations.

Figure 9:
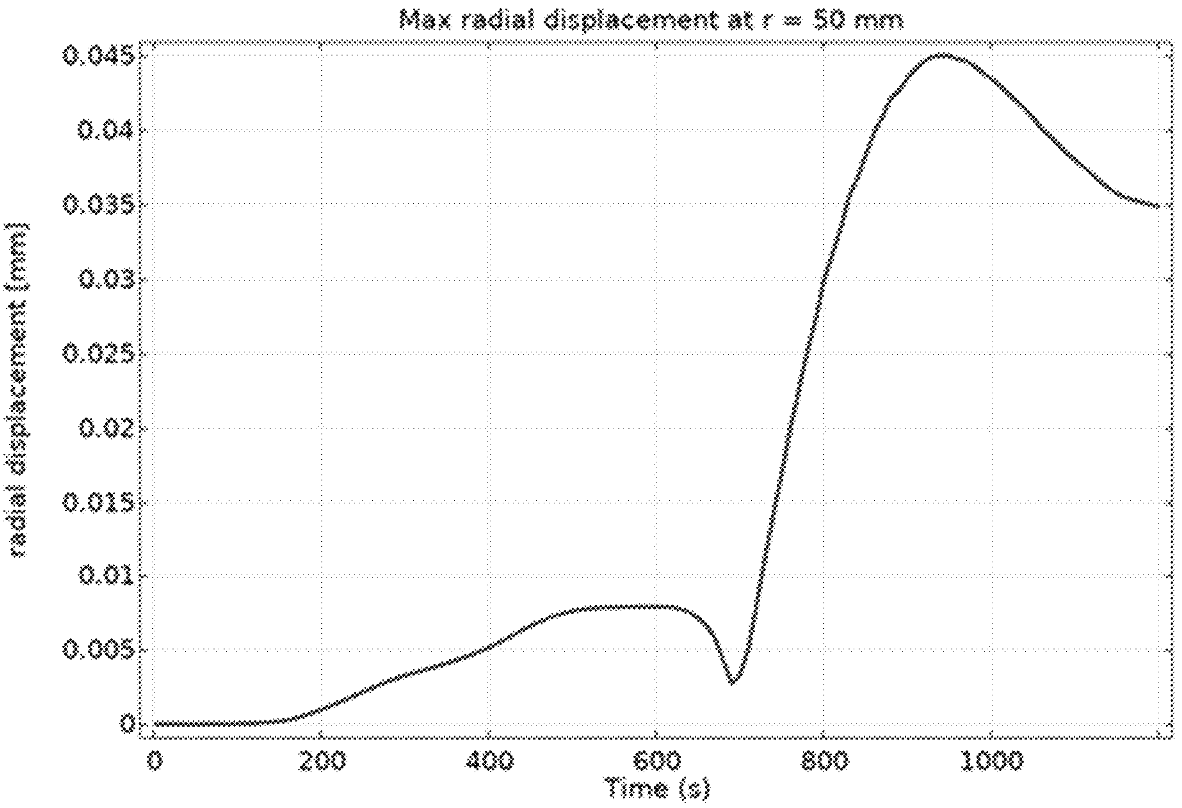
FIG. 9 is a plot of radial displacement (mm) vs Time(s).

FIG. 9 is a plot of radial displacement (mm) vs Time(s). The displacement reaches a maximum at 45 μm at the terminal connection. This plot shows that a very small displacement is encountered even at the maximum. This suggests that the terminal will experience negligible movement when connected to the outer diameter of this disk.

Figure 10:
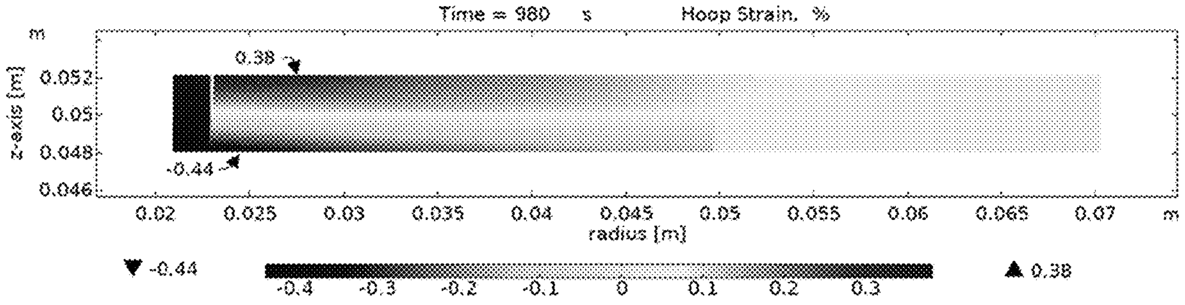
FIG. 10 is a plot of z-axis (mm) vs radius (m) illustrating the hoop strain and net radial compression in a disk coil with overbanding, at time 980 s.

FIG. 10 is a plot of z-axis (m) vs radius (m) illustrating the hoop strain and net radial compression in a disk coil with overbanding, at time 980 s. This is the Azimuthal (Hoop) strain of the tapes in the half disk, with overbanding.

Figure 11:
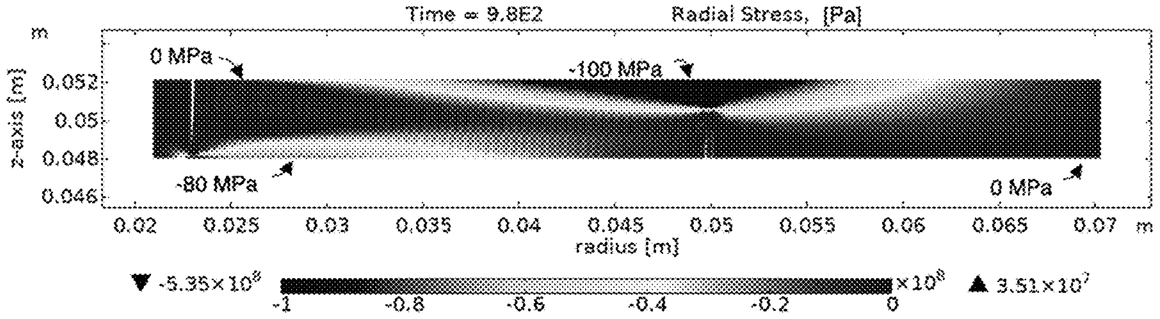
FIG. 11 is a plot of z-axis (m) vs radius (m) illustrating the hoop stress and net radial compression in a disk coil with overbanding, beginning at 0.05 m and extending to 0.07 m, at time 980 s, with screening currents.

FIG. 11 is a plot of z-axis (m) vs radius (m) illustrating the hoop stress and net radial compression in a disk coil with overbanding beginning at 0.05 m and extending to 0.07 m, at time 980 s, with screening currents.

Figure 12:
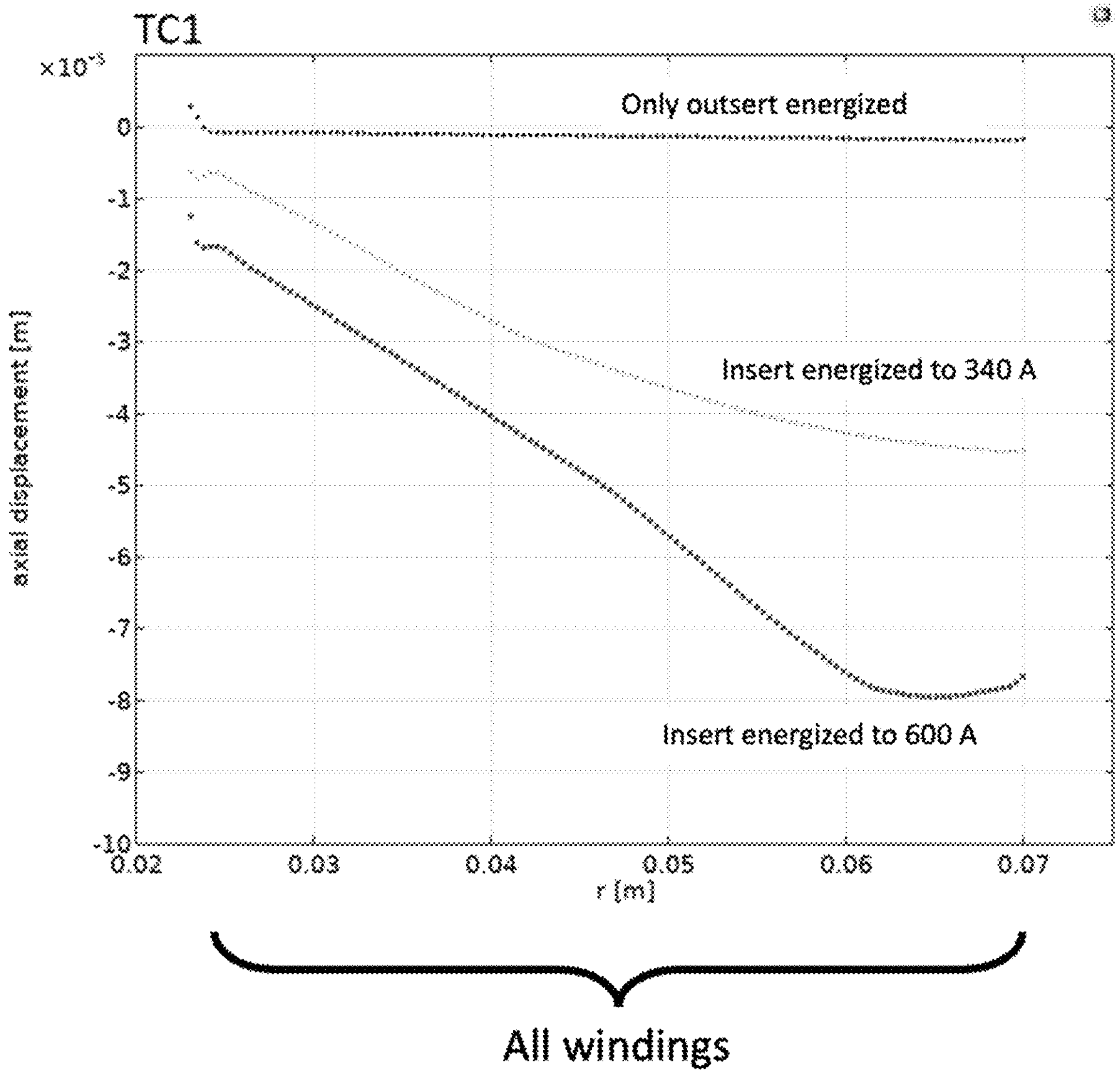
FIG. 12 is a plot of axial displacement (m) vs radius r (m) for a disk coil with insignificant overbanding.

FIG. 12 is a plot of axial displacement (m) vs radius r (m) for a disk coil without significant overbanding. The flat trace represents the 'as wound' windings, and the two lower traces reflect the axial displacements with the coil operated in a background field with half transport current and full transport current, respectively.

Figure 13:
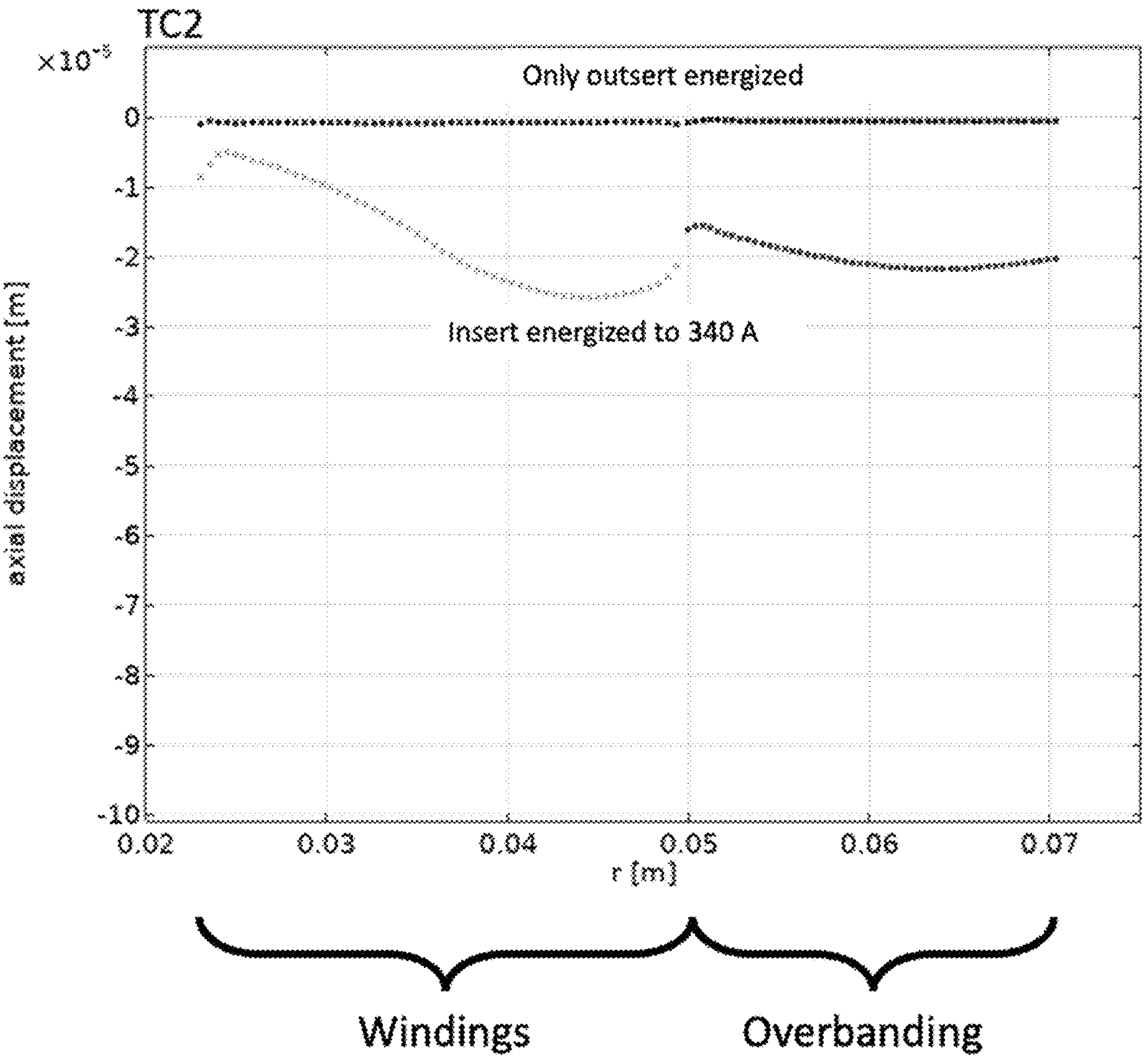
FIG. 13 is a plot of axial displacement (m) vs radius r (m) for a disk coil with significant overbanding.

FIG. 13 is a plot of axial displacement (m) vs radius r (m) for a disk coil with significant overbanding. The flat trace represents the 'as wound' windings, and the lower trace reflects the axial displacement of the windings and significant overbanding while in a background field and charged with full operating current. Overbanding extends from 0.05 m to 0.07 m. The presence of the significant overbanding illustrates the reduction of axial movement.

Figure 14:
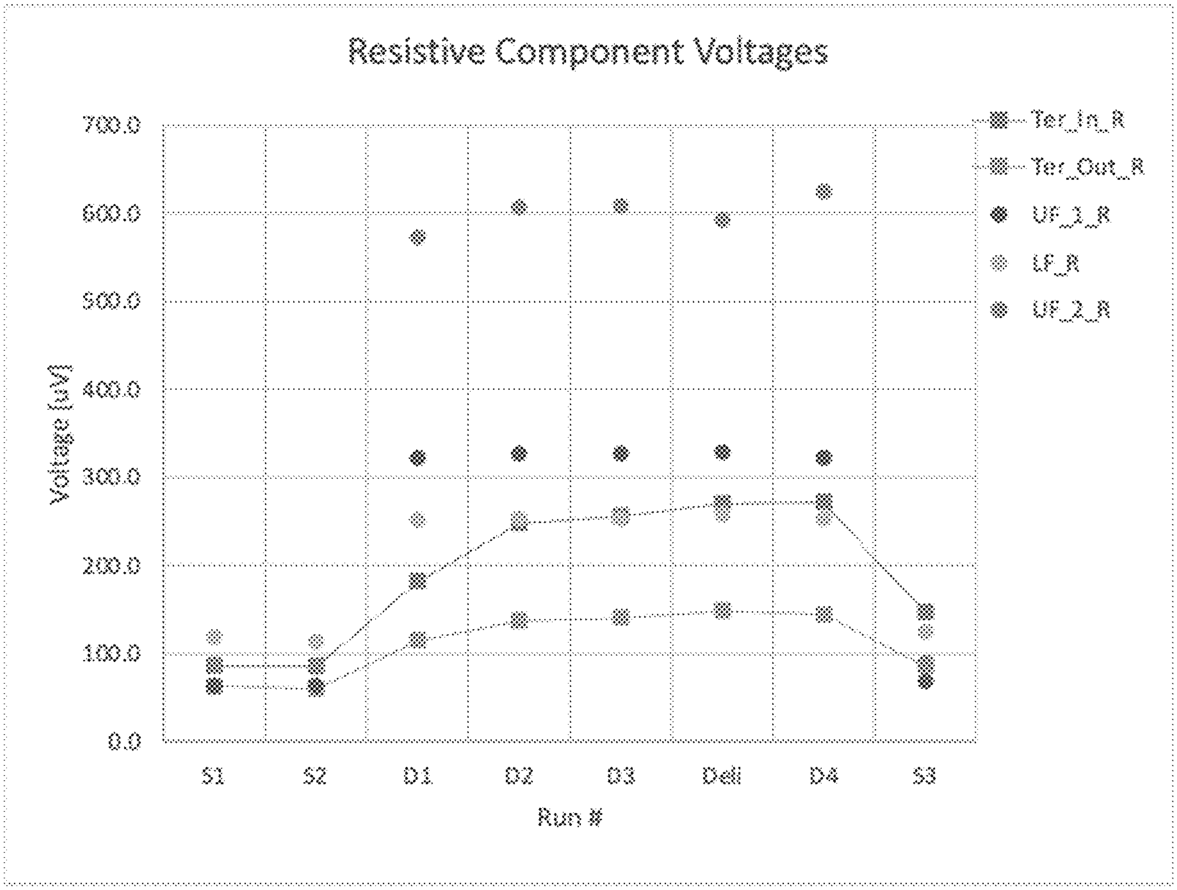
FIG. 14 is a plot of Voltage (V) vs Test No. for a selection of non-superconducting components in a coil stack.

FIG. 14 is a plot of Voltage (V) vs Test No for a selection of resistive components. Terminals are shown to have some magnetoresistance (the voltage tap spans a significant amount of copper as well as the terminal component alone), but this returns back to very low voltages in self-field. Particularly the terminal junctions Ter_In and Ter_out show a return to the starting point, indicating minimal dishing.

Figure 15:
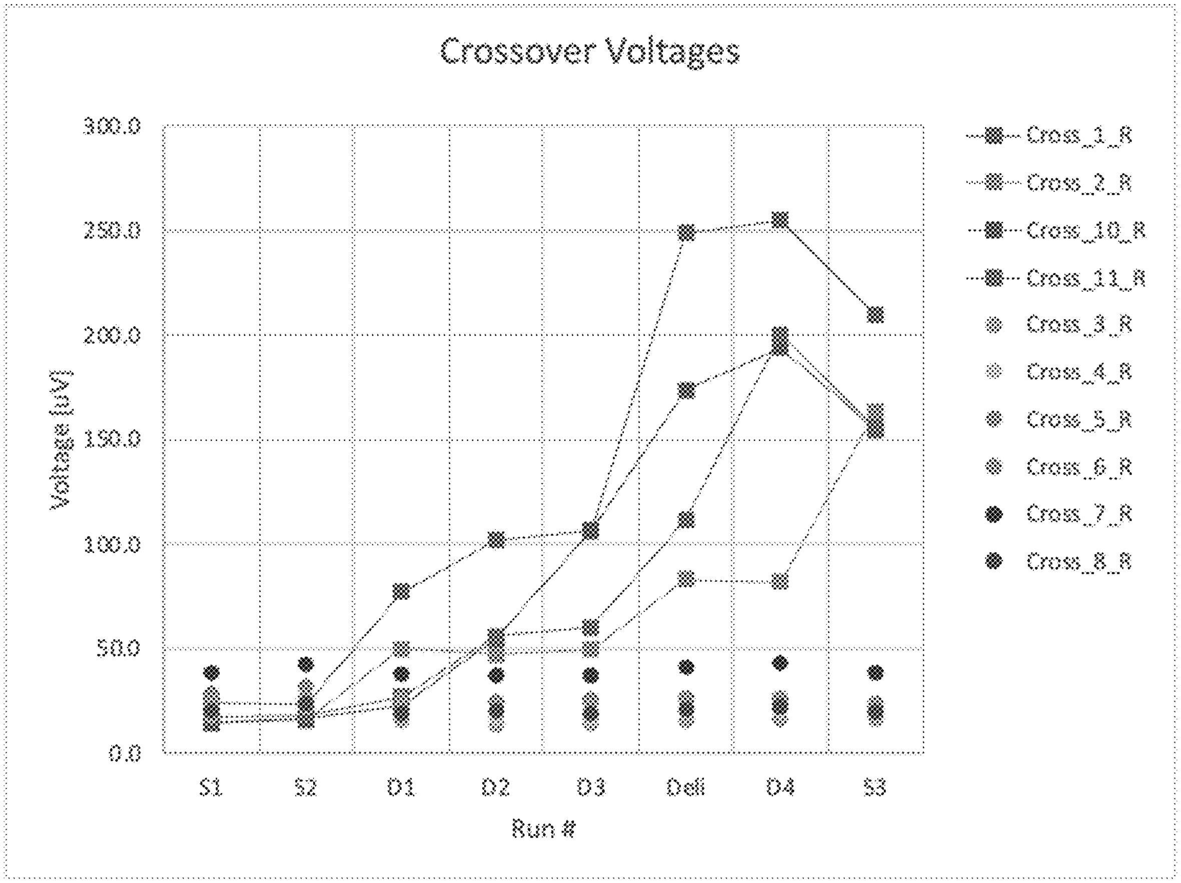
FIG. 15 is a plot of Crossover voltage (V) vs test No. for a selection of crossovers.

FIG. 15 is a plot of crossover voltages (V) vs Test No. for a selection of crossovers. The x-axis reflects a chronological testing run number. When tested repeatedly in field, crossovers near the terminal ends of the coil are observed to degrade. The top-most crossover Cross_1_R is seen to develop increased resistance, indicating damage/degradation. Crossovers near the midplane are not affected. FIGS. 14-15 demonstrate that if the overbanding of the outer diameter for the disk windings near the terminal ends of the stack were to have been adopted, it is expected that all of the crossovers and terminals would behave as the midplane crossovers did.

Figure 16:
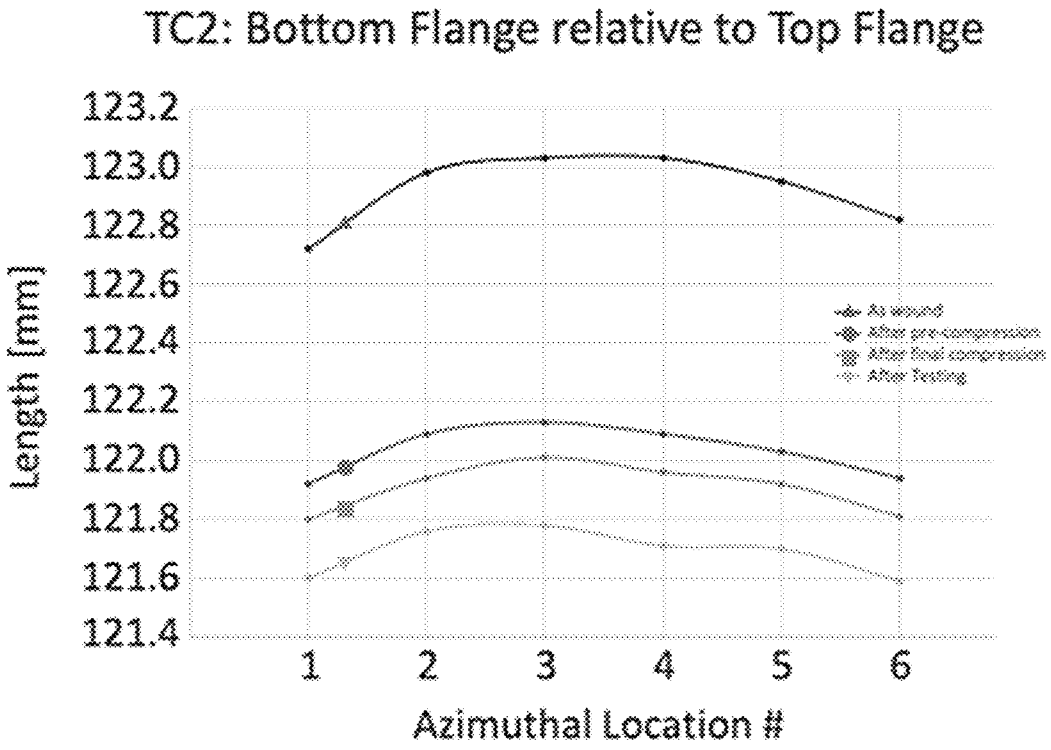
FIG. 16 is a plot of Length (mm) vs Azimuthal Location for As Wound, After Pre-compression, After Final Compression, and After Testing.

FIG. 16 is a plot of Length (mm) vs Azimuthal Location for As Wound, After Pre-compression, After Final Compression, and After Testing. In this plot, the axial length, or height, of the coil is seen to progressively compact-which is expected behavior, but was not observed in the previous coils that did not include this reduced disk diameter approach to eliminate dishing. FIGS. 14-16 illustrate that no damage of the terminals attached to end disks occurs if the overbanding of the invention is present. There is some progressive degradation to the crossovers.

A method of preventing deformation in a non-bonded, tape wound magnet, includes the step of providing a stack of disk coils having outer radius $r_d$ stacked on a z axis having opposing terminal ends. The disk coils comprise pancake-wound superconducting tape, and the superconducting tape comprises a superconducting material. At least one disk coil at each opposing terminal end of the stack is provided with overbanding, wherein the overbanding is positioned radially outward from the pancake wound superconducting tape of a disk. The overbanding comprises a material that has an elastic modulus and ultimate tensile strength at least 50% greater than the elastic modulus and ultimate tensile strength of the superconducting tape. The overbanding can have an electrical resistance at least 100% greater than that of the superconducting material. The overbanding applies radial compression to the pancake wound superconducting tape. The magnet is operated, wherein the radial compression of the overbanding will act against deformation of the respective disk coil.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A non-bonded, tape wound magnet, comprising:
a stack of disk coils, the disk coils having outer radius $r_d$ stacked on a z axis having opposing terminal ends;
the disk coils comprising pancake-wound superconducting tape, the superconducting tape comprising a superconducting material and having a wound radius $r_{sc}$;
at least one disk coil comprises overbanding, wherein the overbanding is positioned radially outward from the pancake wound superconducting tape of a disk, and comprises a material that has an elastic modulus and ultimate tensile strength at least 50% greater than the elastic modulus and ultimate tensile strength of the superconducting tape,
wherein the overbanding applies radial compression to the pancake wound superconducting tape.

2. The magnet of claim 1, wherein the radial dimension $r_o$ of the overbanding from disk coil to disk coil is symmetrical about the z axis.

3. The magnet of claim 1, wherein the overbanding comprises a material with a coefficient of linear expansion and the coefficient of linear expansion of the overbanding is selected such the overbanding will remain in contact with and apply radial compression to the superconducting tape as the temperature of the magnet is lowered.

4. The magnet of claim 3, wherein the coefficient of linear expansion of the overbanding from 293 K to 4 K is within 125% of the coefficient of linear expansion of the superconducting tape from 293 K to 4 K.

5. The magnet of claim 1, wherein the overbanding of a disk coil is a pancake wound tape wound about a pancake wound superconducting tape in the disk coil so as to apply radial compression to the pancake wound superconducting tape.

6. The magnet of claim 1, wherein the overbanding comprises stainless steel, Hastelloy, or Inconel®.

7. The magnet of claim 1, wherein the radius $r_{sc}$ of the pancake-wound superconducting tape for different disk coils is staggered with the $r_{sc}$ of disk coils at the terminal ends being less than the $r_{sc}$ for disk coils not at the terminal ends, and the radial dimension $r_o$ of the overbanding for the respective disk coils is staggered.

8. The magnet of claim 1, wherein the overbanding has an electrical resistance at least 100% greater than that of the superconducting material, the overbanding having a radial dimension $r_o$.

9. The magnet of claim 1, wherein a disk coil comprising overbanding is provided at each opposing terminal end of the stack.

10. A method of preventing deformation in a non-bonded, tape wound magnet, comprising the steps of:
providing a stack of disk coils having outer radius $r_d$ stacked on a z axis having opposing terminal ends, the disk coils comprising pancake-wound superconducting tape, the superconducting tape comprising a superconducting material;
providing at least one disk coil at each opposing terminal end of the stack having overbanding, wherein the overbanding is positioned radially outward from the pancake wound superconducting tape of a disk, and comprises a material that has an elastic modulus and ultimate tensile strength at least 50% greater than the elastic modulus and ultimate tensile strength of the superconducting tape;
applying radial compression to the pancake wound superconducting tape with the overbanding; and,
operating the magnet, wherein the radial compression of the overbanding will act against deformation of the respective disk coil.

11. The method of claim 10, wherein the radial dimension $r_o$ of the overbanding from disk coil to disk coil is symmetrical about the z axis.

12. The method of claim 10, wherein the overbanding comprises a material with a coefficient of linear expansion and the coefficient of linear expansion of the overbanding is selected such the overbanding will remain in contact with and apply radial compression to the superconducting tape as the temperature of the magnet is lowered.

13. The method of claim 12, wherein the coefficient of linear expansion between 293 K and 4 K of the overbanding is within 125% of the coefficient of linear expansion from 293 K and 4 K of the superconducting tape.

14. The method of claim 10, wherein the overbanding of a disk coil is a pancake wound tape wound about a pancake wound superconducting tape in the disk coil so as to apply radial compression to the pancake wound superconducting tape.

15. The method of claim 10, wherein the overbanding comprises stainless steel, Hastelloy, or Inconel®.

16. The method of claim 10, wherein the radius $r_{sc}$ of the pancake-wound superconducting tape for different disk coils is staggered with the $r_{sc}$ of disk coils at the terminal ends being less than the $r_{sc}$ for disk coils not at the terminal ends, and the radial dimension $r_o$ of the overbanding for the respective disk coils is staggered.

17. The method of claim 10, wherein the overbanding has an electrical resistance at least 100% greater than that of the superconducting tape.

* * * * *